(12) United States Patent
Xu

(10) Patent No.: US 11,859,808 B1
(45) Date of Patent: Jan. 2, 2024

(54) MULTIFUNCTIONAL BRACKET AND A METHOD OF USING IT

(71) Applicant: Ningbo Beilun Jiayao Plastic Products Co., Ltd., Zhejiang (CN)

(72) Inventor: Jiahong Xu, Zhejiang (CN)

( * ) Notice: Subject to any disclaimer, the term of this patent is extended or adjusted under 35 U.S.C. 154(b) by 0 days.

(21) Appl. No.: 18/456,505

(22) Filed: Aug. 27, 2023

(51) Int. Cl.
*F21V 33/00* (2006.01)
*H02J 7/00* (2006.01)
*H04M 1/04* (2006.01)

(52) U.S. Cl.
CPC ...... *F21V 33/0048* (2013.01); *F21V 33/0032* (2013.01); *H02J 7/0042* (2013.01); *H04M 1/04* (2013.01)

(58) Field of Classification Search
None
See application file for complete search history.

(56) References Cited

U.S. PATENT DOCUMENTS

| 9,709,213 | B2 * | 7/2017 | Zheng | F16M 11/041 |
|---|---|---|---|---|
| 2012/0160973 | A1 * | 6/2012 | Du | F16M 11/041 248/440.1 |
| 2012/0305503 | A1 * | 12/2012 | Smith | G06F 1/1667 211/26 |
| 2013/0148270 | A1 * | 6/2013 | Fujioka | F16M 11/22 361/679.01 |

* cited by examiner

*Primary Examiner* — Xanthia C Relford
(74) *Attorney, Agent, or Firm* — Hawaii Patent Services; Nathaniel K. Fedde; Kenton N. Fedde

(57) ABSTRACT

The present invention provides a multifunctional bracket and a method, the multifunctional bracket comprising a photo frame, a mobile phone holder, a support rod, a stand column, and a base stand, the photo frame comprises a fixed backboard and a transparent board, the bottom ends of the fixed backboard and the transparent board are fixedly connected, and the upper ends are connected to each other in a detachable manner; the mobile phone holder includes a stand backboard and a support board, the stand backboard and the support board are attached to each other, and a charging device is installed on the back of the stand backboard; the top of the support rod is equipped with a third slot, and a detachable light bulb is placed in the third slot; the stand column comprises a cylinder and a placement block, the method is the method of using the multifunctional bracket.

20 Claims, 11 Drawing Sheets

MULTIFUNCTIONAL BRACKET AND A METHOD OF USING IT

TECHNICAL FIELD

The present invention relates to the technical field of a bracket, in particular to a multifunctional bracket and a method of using it.

BACKGROUND

With the development of the information industry and the improvement of living standards, under normal circumstances, we always place photo frames as decorations and desk lamps for lighting on our desks. At the same time, a mobile phone holder and charger are also set up on the desk. However, the placement of various items can make the desk look messy and crowded, which greatly reduces the user experience. Therefore, there is a need for a multipurpose bracket to solve this problem.

U.S. Patent No. 20200046147 discloses a photo frame with a wireless charging device, which includes a frame with a front and back side. The back side can be removed in whole or in part, and the charging device is set between the front and back sides of the frame. The frame lifts the charging unit from the table or desktop so that the device being charged can be placed on the glass covering the picture in front of the frame without falling off. However, this photo holder is inconvenient when changing photos, and its functions are limited, which cannot meet user needs.

Korean Patent No. 2020100002065 discloses a mobile phone charger lamp holder with a socket, which includes a frame. A storage part is set in the center of the frame, and a photo is located in the storage part. A transparent protective plate is installed in the accommodating part formed in the frame. A back cover is installed on the back surface of the frame and is attached by double-sided tape. The surface of the board is equipped with light-emitting diodes, and the plug of the mobile phone charger powers the light-emitting diodes. The support device includes a support plate that is rotatably installed on the back cover through a hinge and a fixing belt connected between the support plate and the back cover. This frame uses double-sided tape for fixation, which is inconvenient for users to change photos at any time and is troublesome.

Based on these problems, it is necessary to propose a new type of multifunctional bracket. This bracket can make photos more stable and convenient to change. At the same time, this bracket has functions such as lighting, supporting mobile phones, wireless charging, and acting as a bracket. It has multiple functions, convenience, beauty and other advantages. It plays a multi-purpose effect and further improves user experience.

SUMMARY

The present invention provides a multifunctional bracket, comprising:
a photo frame, a mobile phone holder, a support rod, a stand column, and a base stand, wherein
said photo frame is composed of a fixed backboard and a transparent board, the bottom ends of said fixed backboard and said transparent board are fixedly connected, and the upper ends are connected to each other in a detachable manner;
said mobile phone holder includes a stand backboard and a support board, said stand backboard and said support board are attached to each other, and a charging device is installed on the back of said stand backboard;
the top of said support rod is equipped with a third slot, and a detachable light bulb is placed in said third slot;
said stand column is composed of a cylinder and a placement block, said placement block is configured at the top of said cylinder;
among them, said base stand is configured to bear said photo frame and said mobile phone holder, said support rod and said stand column are respectively set on both sides of said photo frame.

The present invention also provides a method of using a multifunctional bracket, comprising: providing a multifunctional bracket,
said multifunctional bracket includes a photo frame, a mobile phone holder, a support rod, a stand column, and a base stand, said photo frame is composed of a fixed backboard and a transparent board; said mobile phone holder includes a stand backboard and a support board, and a charging device is installed on the back of said stand backboard; the top of said support rod is equipped with a detachable light bulb; said support rod includes a circular platform; both said circular platform and said support rod are equipped with a fixed sleeve; said base stand is equipped with at least two connection holes and at least two connection slots, and a limit block is set on the upper surface of said base stand, wherein
said photo frame is inserted into said connection slot at an angle, forming an insert connection with said base stand;
said mobile phone holder is inserted into said connection slot at an angle, forming an insert connection with said base stand;
said support rod is inserted into said connection hole, and fixed on the upper surface of said base stand through said fixed sleeve;
said stand column is inserted into said connection hole, and fixed on the upper surface of said base stand through said fixed sleeve.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the drawings.

Figure 1:
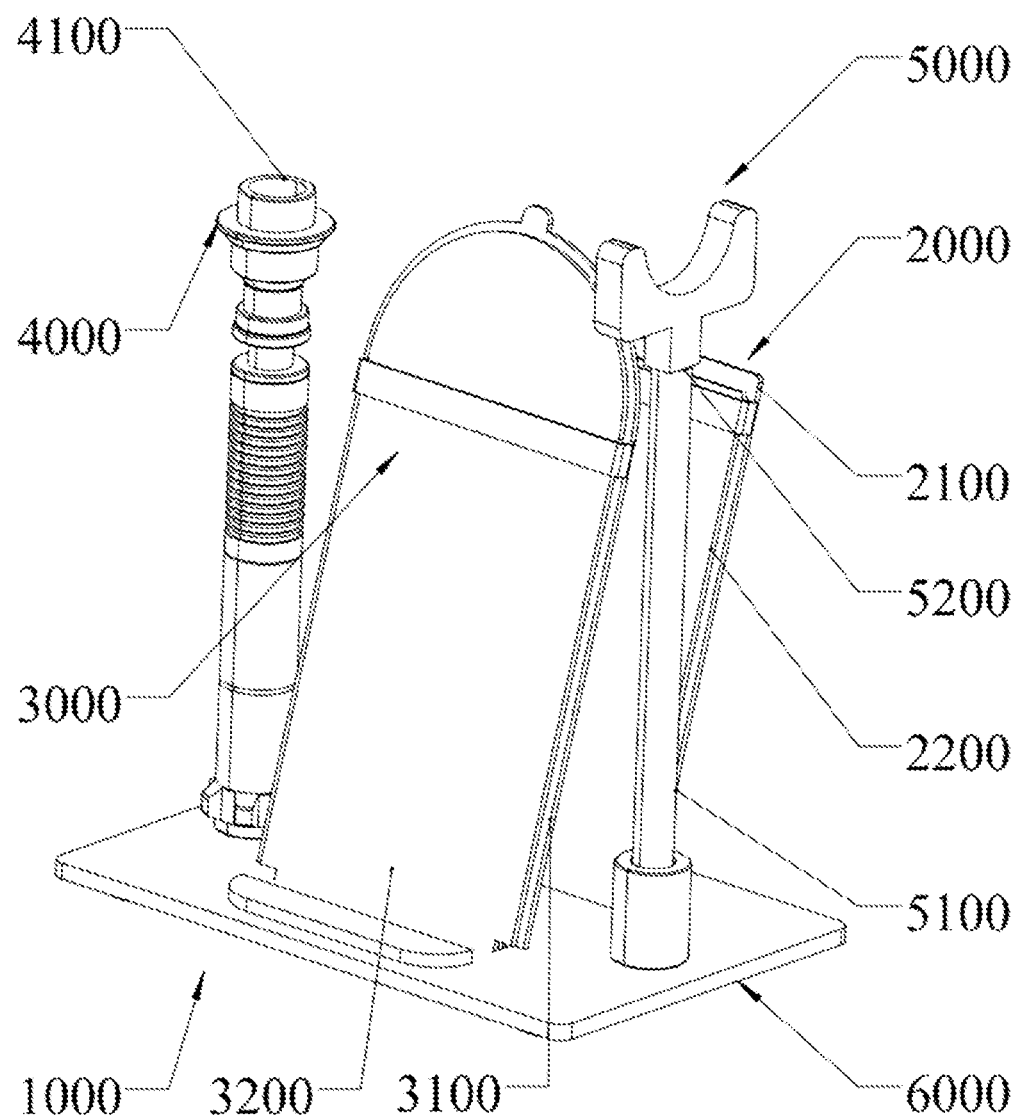
FIG. 1 is a schematic diagram of the structure of the present invention.

1000, multifunctional bracket; 2000, photo frame; 2100, fixed backboard; 2110, first slot; 2200, transparent board; 2300, first connection section; 3000, mobile phone holder; 3100, stand backboard; 3110, second slot; 3200, support board; 3300, second connection section; 4000, support rod; 4100, third slot; 5000, stand column; 5100, cylinder; 5200, placement block; 5300, circular platform; 6000, base stand; 6100, connection hole; 6200, connection slot; 6300, limit block; 6400, anti-slip mat; 6500, fixed sleeve.

DESCRIPTION OF EMBODIMENTS

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. May be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

In describing the preferred embodiments, specific terminology will be resorted to for the sake of clarity. It is to be understood that each specific term includes all technical equivalents which operate in a similar manner to accomplish a similar purpose.

As a preferred embodiment of this invention, in order to make the bracket multifunctional, simple in structure, more aesthetically pleasing and convenient to use overall, this invention provides a multifunctional bracket 1000.

Figure 2:
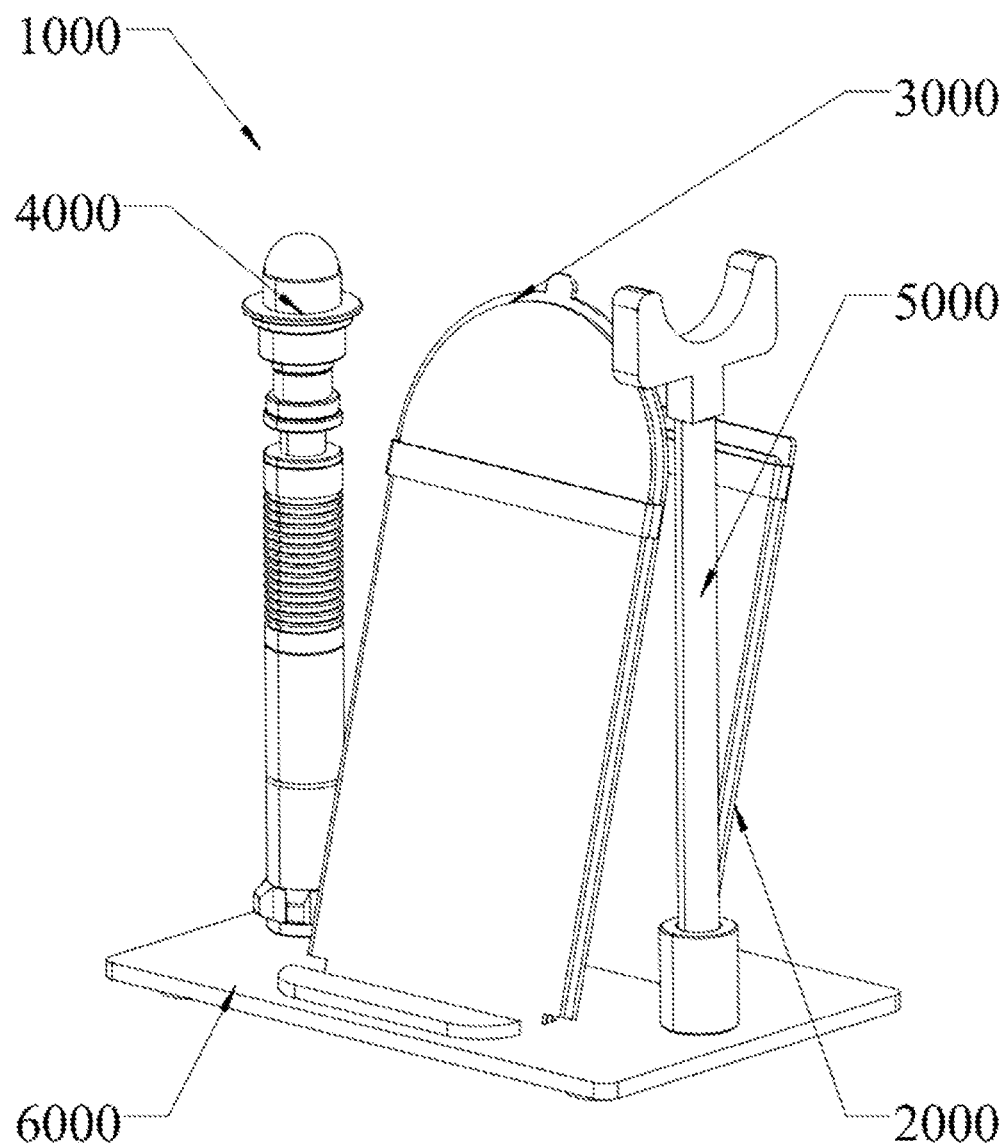
FIG. 2 is a schematic diagram of the structure of the present invention.

As shown in FIGS. 1 and 2, this invention provides a multifunctional bracket 1000, which includes a photo frame 2000, a mobile phone holder 3000, a support rod 4000, a stand column 5000 and a base stand 6000.

Figure 3:
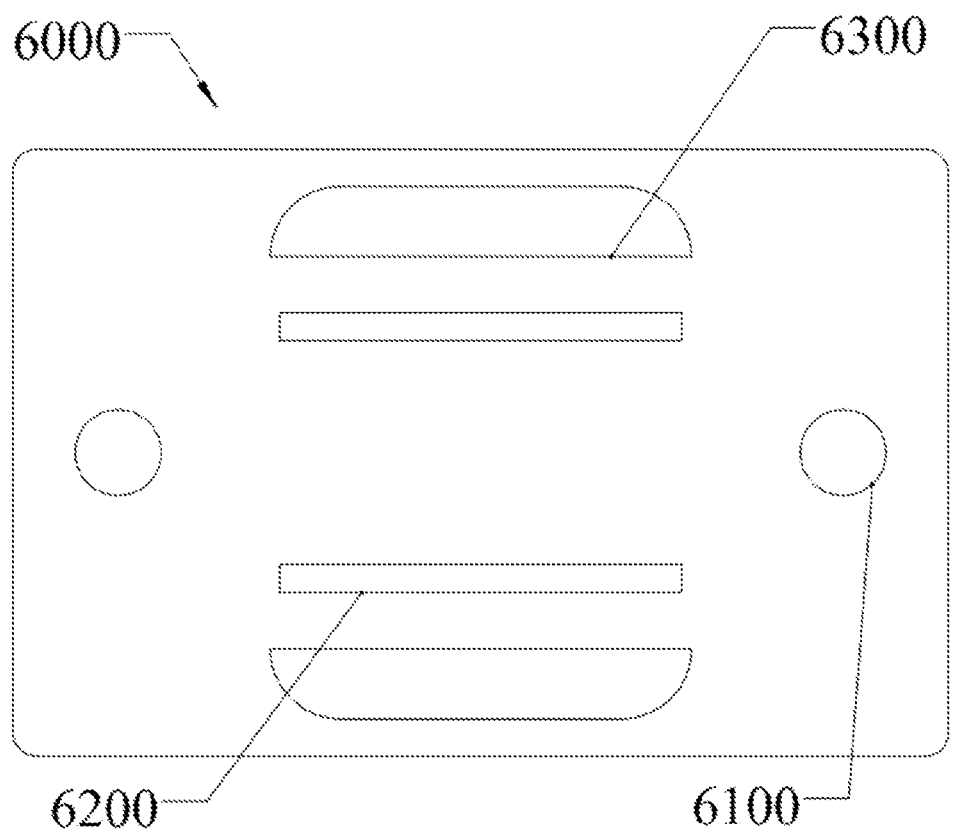
FIG. 3 is a schematic diagram of the upper surface of the base stand of the present invention.
Figure 4:
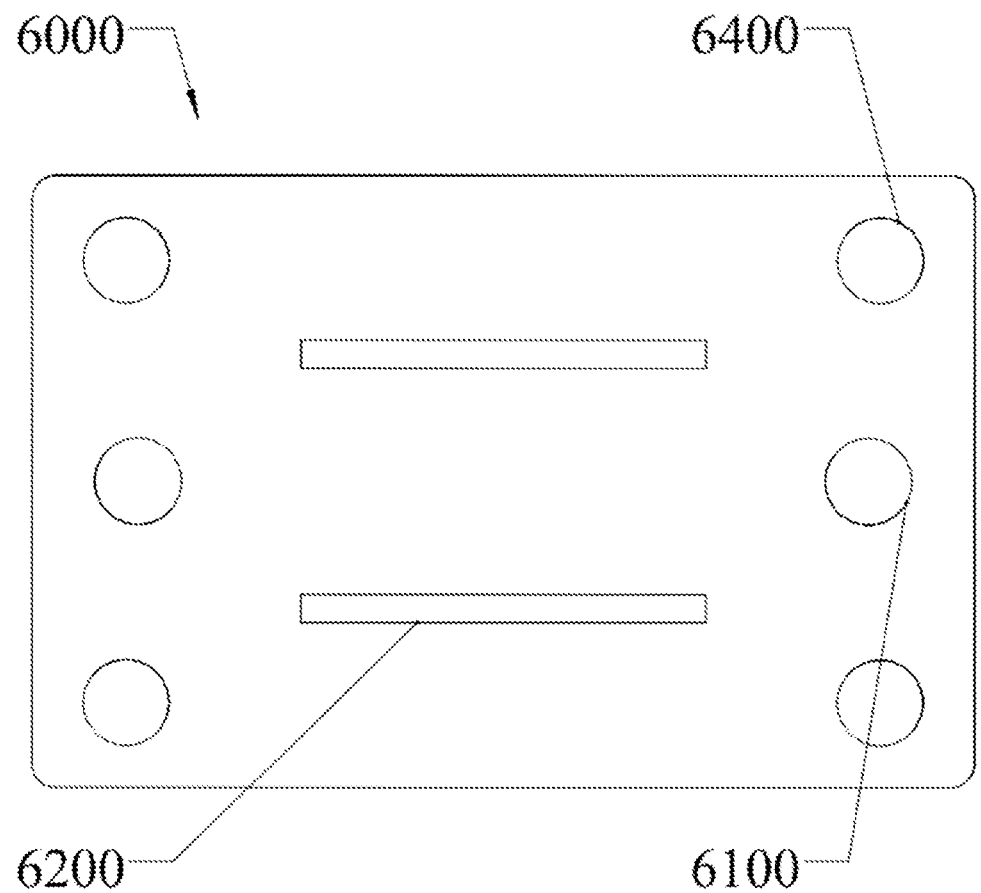
FIG. 4 is a schematic diagram of the lower surface of the base stand of the present invention.

As shown in FIGS. 3 and 4, the base stand 6000 is a basic component with a fixed function. It is roughly rectangular in shape with four inverted rounded corners. The rounded corner structure can prevent the four sharp corners of the rectangle from causing harm to the user. In some embodiments, the shape of the base stand 6000 can also be square, or circular, or triangular or other desired geometric shapes.

In this embodiment, as shown in FIG. 3, two connection holes 6100 and two connection slots 6200 are set on the upper surface of the base stand 6000. The connection holes 6100 and connection slots 6200 are symmetrically distributed on the upper surface of the base stand 6000. At the same time, the connection holes 6100 and connection slots 6200 penetrate the upper and lower surfaces of the base stand 6000 and have a hollow structure inside.

Furthermore, symmetrical limit blocks 6300 are also set on the upper surface of the base stand 6000. The limit blocks 6300 are protruding structures that mainly serve to limit the position of mobile phones to prevent them from sliding off the mobile phone holder 3000 and causing damage.

Further, as shown in FIG. 4, multiple anti-slip mats 6400 are set on the lower surface of the base stand 6000. The anti-slip mats 6400 are located near the four rounded corners. When using the multifunctional bracket 1000, the anti-slip mats 6400 can prevent the entire bracket from slipping during use.

Preferably, the material of the base stand 6000 is aluminum alloy, which has high strength, light weight and is soft. In some embodiments, the material of the base stand 6000 can also be stainless steel, or iron, or other load-bearing materials, as long as it can keep the multifunctional bracket 1000 stable.

Figure 5:
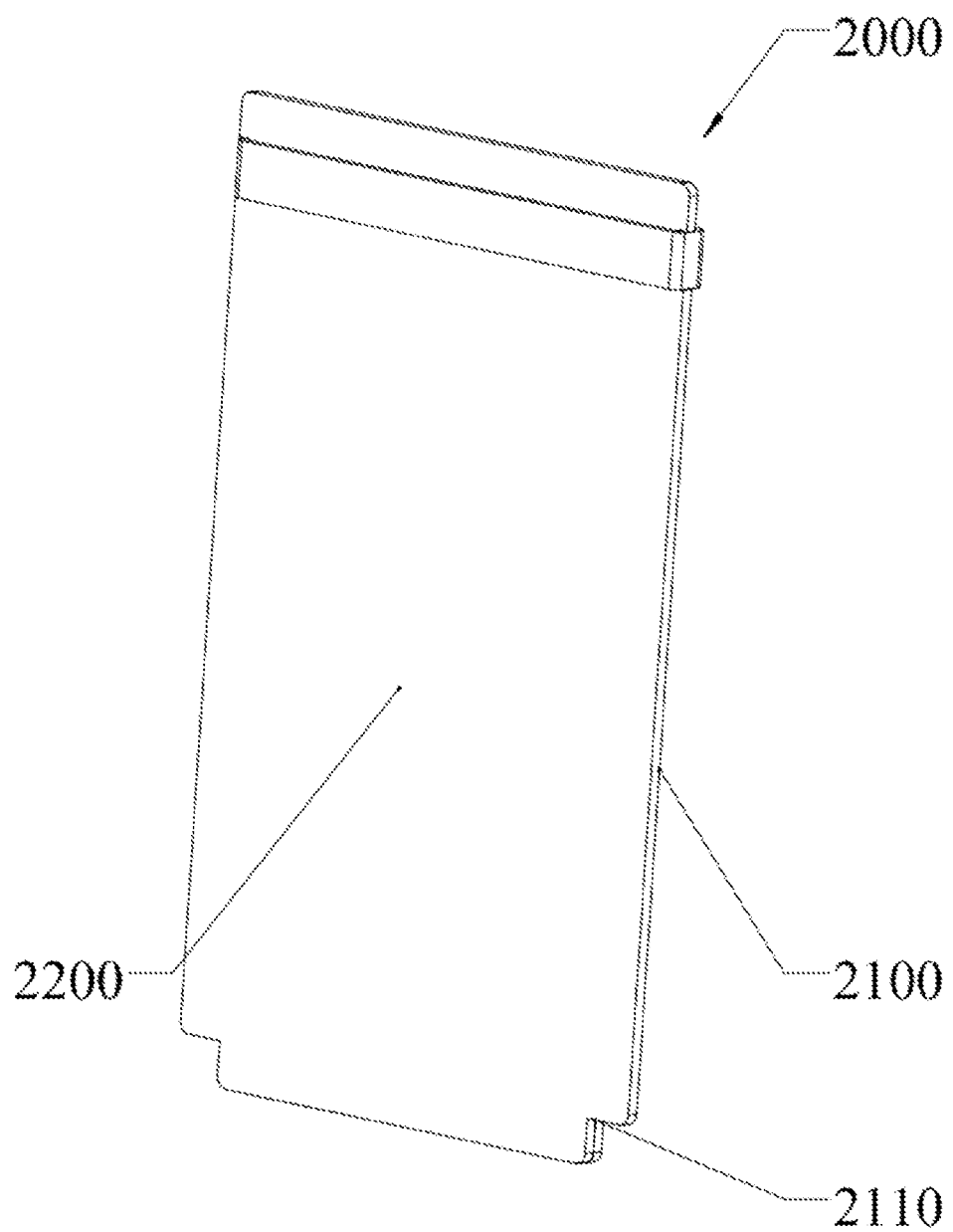
FIG. 5 is a schematic diagram of the photo frame of the present invention.
Figure 6:
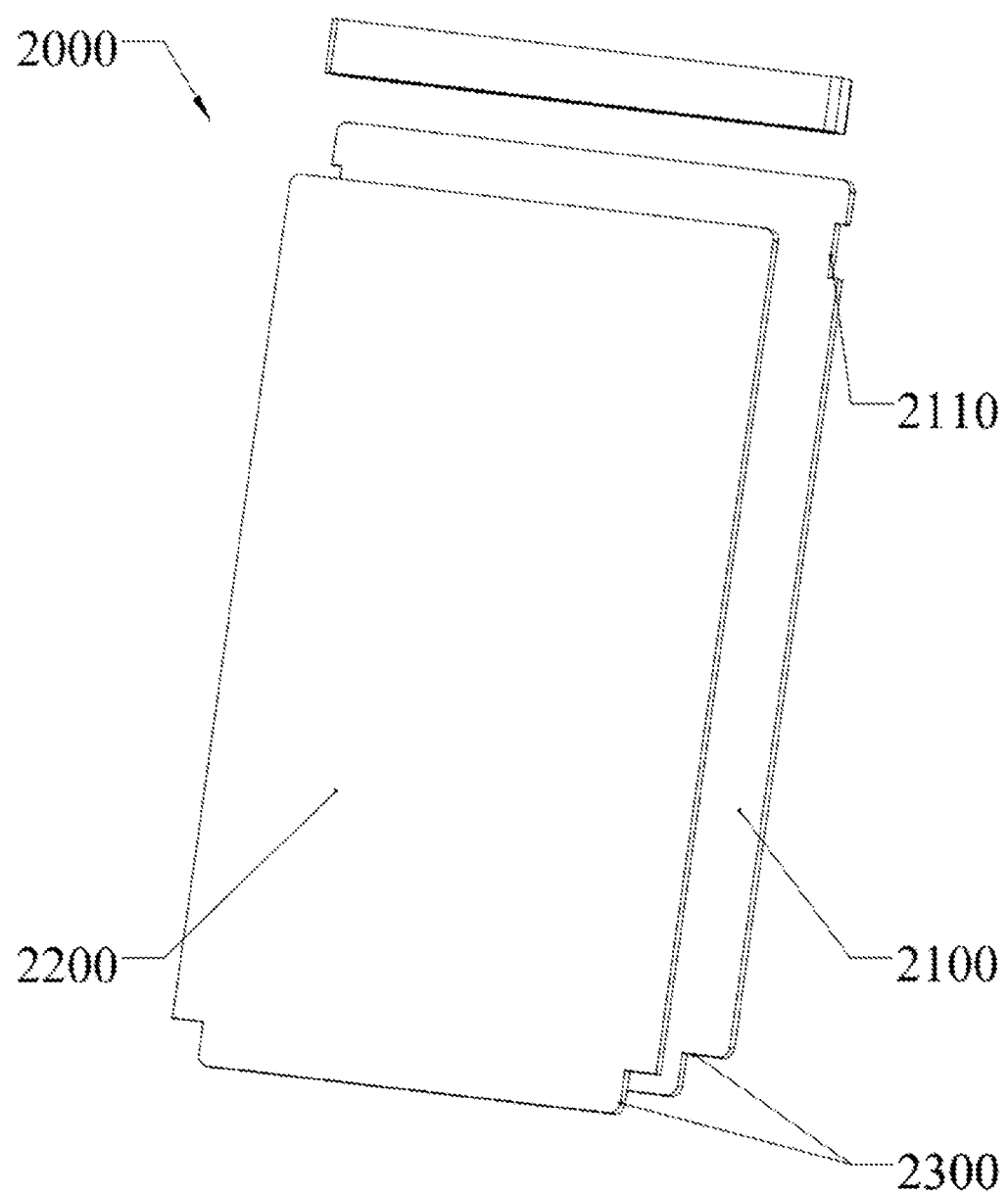
FIG. 6 is an exploded view of the photo frame of the present invention.

As shown in FIGS. 5 and 6, the photo frame 2000 is a photo display component with a detachable structure. It includes a fixed backboard 2100 and a transparent board 2200. The fixed backboard 2100 and the transparent board 2200 are rectangular in shape. The surface area of the fixed backboard 2100 is larger than that of the transparent board 2200, so that the transparent board 2200 is attached to the fixed backboard 2100, and they are closely attached together.

In some embodiments, the shape of the fixed backboard 2100 and the transparent board 2200 can also be oval, or circular, or triangular or other desired geometric shapes.

Further, as shown in FIG. 6, both the lower ends of the fixed backboard 2100 and the transparent board 2200 are equipped with identical first connection section 2300. The two first connection sections 2300 are fixedly connected together by means of glue. The upper ends of the fixed backboard 2100 and the transparent board 2200 are detachably fixed by an elastic silicone tape. There is a first slot 2110 at the upper end of the fixed backboard 2100. The elastic silicone tape is placed in the first slot 2110. As a result, the elastic silicone tape will be stably fixed in the first slot 2110, without moving up and down. At the same time, using an elastic silicone tape can make the attachment degree of the fixed backboard 2100 and transparent board 2200 tighter. The photos are not easy to fall off. The replacement of elastic silicone tape is also more convenient and does not affect the overall structure of photo frame 2000.

It should be further explained that the connection method between fixed backboard 2100 and transparent board 2200 is not limited to above-mentioned connection methods. Those skilled in this field can flexibly adjust and set up connection methods between fixed backboard 2100 and transparent board 2200 in actual application. As long as it can make fixed backboard 2100 and transparent board 2200 detachably connected, for example, Velcro connection method, or zipper connection method, or buckle connection method or other remaining connection fixing methods.

In this embodiment, apart from the lower ends of the fixed backboard 2100 and the transparent board 2200 being attached and non-detachable, other parts are detachably attached. This allows the upper ends of the fixed backboard 2100 and the transparent board 2200 to have a small opening angle, with the opening angle between 0° and 30°. In some embodiments, the opening angle can also be other degrees, as long as the opening angle does not destroy the fixed connection structure at the lower end of the fixed backboard 2100 and the transparent board 2200.

Specifically, when the photo frame 2000 needs to be connected with the base stand 6000, the first connection section 2300 at the lower ends of the fixed backboard 2100 and the transparent board 2200 completely overlap and are attached and fixed. The first connection section 2300 is inserted into the connection slot 6200, thus completing the detachable connection between the photo frame 2000 and the base stand 6000.

When a photo needs to be placed in the photo frame 2000, remove the elastic silicone tape connecting the fixed backboard 2100 and transparent board 2200. Without destroying the connection relationship of the first connection section 2300 at the lower end, open a certain angle between backboard 2100 and transparent board 2200, place the photo in between them, so that the photo is clamped between backboard 2100 and transparent board 2200.

When it is necessary to change the photo in photo frame 2000, open a certain angle between backboard 2100 and transparent board 2200, take out the original photo from between backboard 2100 and transparent board 2200, and put in a new photo.

In this embodiment, the backboard 2100 and the transparent board 2200 are made of different materials. The material of the backboard 2100 is aluminum alloy, which has high strength, light weight and is soft. In some embodiments, the material of the backboard 2100 can also be stainless steel, or iron, or plastic or other rigid materials. The material of the transparent board 2200 is acrylic. In some embodiments, the material of the transparent board 2200 can also be plastic, or glass, or polymer material, or optical ceramics or other transparent visual materials.

Figure 7:
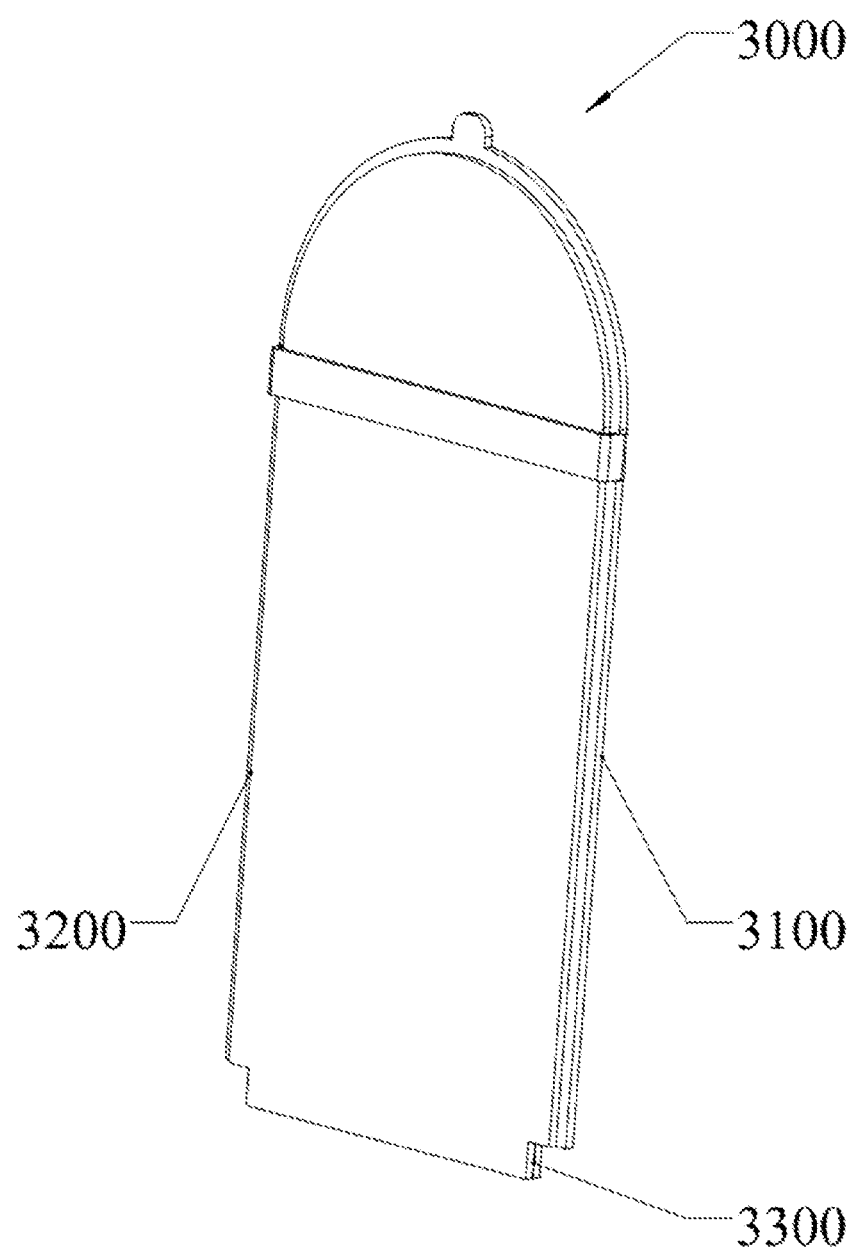
FIG. 7 is a schematic diagram of the mobile phone holder of the present invention.
Figure 8:
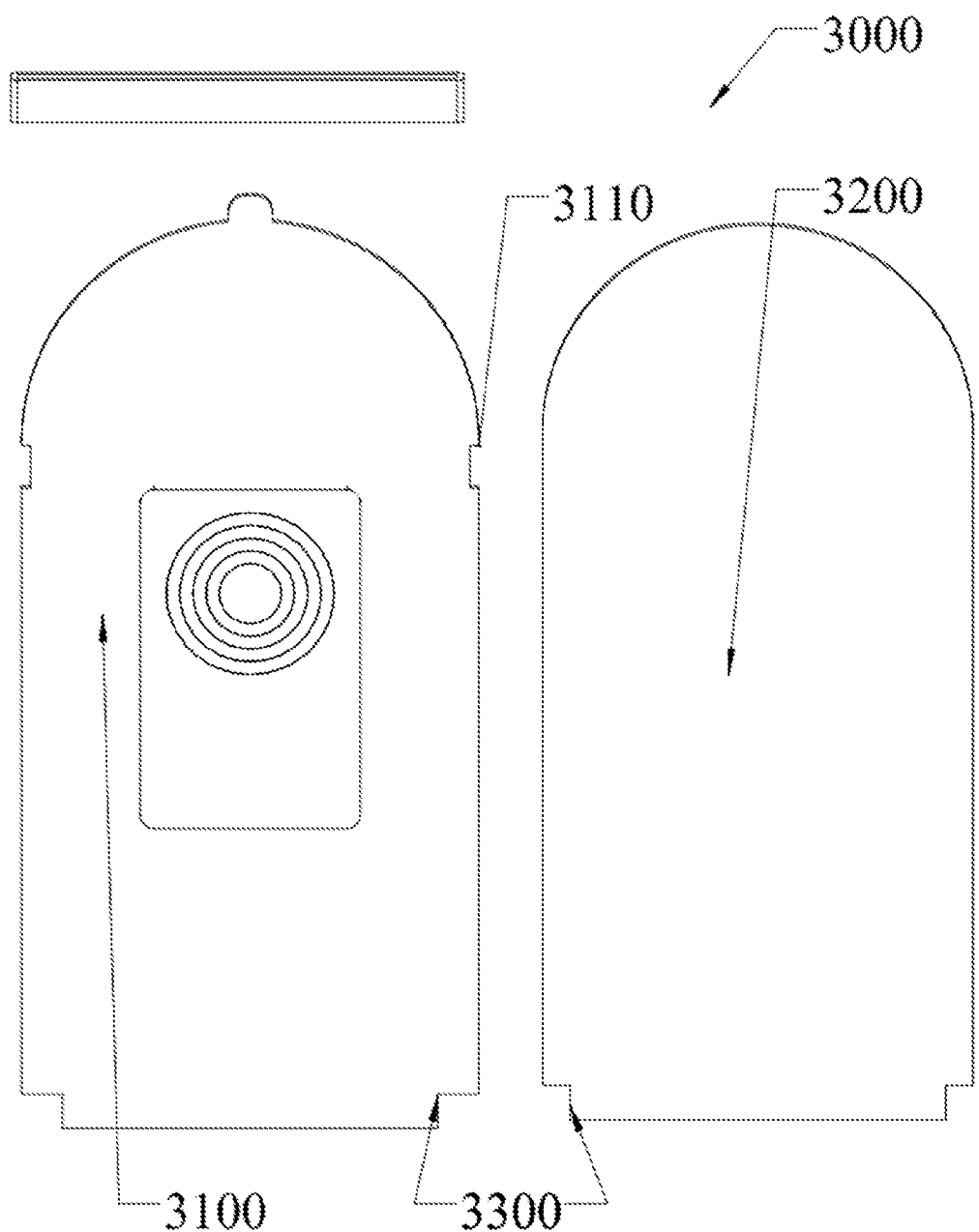
FIG. 8 is an exploded view of the mobile phone holder of the present invention.

As shown in FIGS. 7 and 8, the mobile phone holder 3000 is a mobile phone display component with a charging function. It includes a stand backboard 3100 and a support board 3200. The fixed backboard 2100 and the transparent board 2200 are track-shaped. The track shape is composed of a rectangle and a semi-circle, with the semi-circular structure on top of the rectangle. At the same time, there is also a protruding semi-circular block at the top end of the stand backboard 3100, which serves as decoration. The surface area of the stand backboard 3100 is larger than that of the support board 3200, so that the support board 3200 is attached to the stand backboard 3100, and they are closely attached together.

In some embodiments, the shape of the stand backboard 3100 and support board 3200 can also be square, or circular, or triangular or other desired geometric shapes.

Further, as shown in FIG. 8, both the lower ends of the stand backboard 3100 and the support board 3200 are equipped with identical second connection section 3300. The two second connection sections 3300 are fixedly connected together by means of glue. The upper ends of the stand backboard 3100 and the support board 3200 are detachably fixed by an elastic silicone tape. There is a second slot 3110 at the upper end of the stand backboard 3100. The elastic silicone tape is placed in the second slot 3110. As a result, the elastic silicone tape will be stably fixed in the second slot 3110, without moving up and down. At the same time, using an elastic silicone tape can make the attachment degree of the stand backboard 3100 and support board 3200 tighter. The photo is not easy to fall off. The replacement of elastic silicone tape is also more convenient and does not affect the overall structure of mobile phone holder 3000.

It should be further explained that the connection method between stand backboard 3100 and support board 3200 is not limited to above-mentioned connection methods. Those skilled in this field can flexibly adjust and set up connection methods between stand backboard 3100 and support board 3200 in actual application. As long as it can make stand backboard 3100 and support board 3200 detachably connected, for example, Velcro connection method, or zipper connection method, or buckle connection method or other remaining connection fixing methods.

Specifically, when mobile phone holder 3000 needs to be connected with base stand 6000, the second connection section 3300 at the lower ends of stand backboard 3100 and support board 3200 completely overlap and are attached and fixed. The second connection section 3300 is inserted into the connection slot 6200, thus completing the detachable connection between mobile phone holder 3000 and base stand 6000.

When a mobile phone needs to be placed on mobile phone holder 3000, lean the mobile phone on support board 3200. The limit block 6300 on base stand 6000 limits the position of mobile phone to prevent it from sliding off mobile phone holder 3000 and causing damage.

When a mobile phone needs to be charged, a charging device is set on stand backboard 3100. Turn on the power switch to charge the mobile phone.

Further, photo frame 2000 and mobile phone holder 3000 are placed parallel to each other on base stand 6000. Photo frame 2000 is placed behind mobile phone holder 3000. There is a gap distance of 5 cm to 10 cm between photo frame 2000 and mobile phone holder 3000. In some embodiments, the gap distance can also be other lengths as long as it allows photo frame 2000 and mobile phone holder 3000 to be placed normally.

In this embodiment, stand backboard 3100 and support board 3200 are made of the same material. The material is aluminum alloy which has high strength, light weight and is soft. In some embodiments, the material of stand backboard 3100 and support board 3200 can also be stainless steel, or iron, or plastic or other rigid materials.

Figure 9:
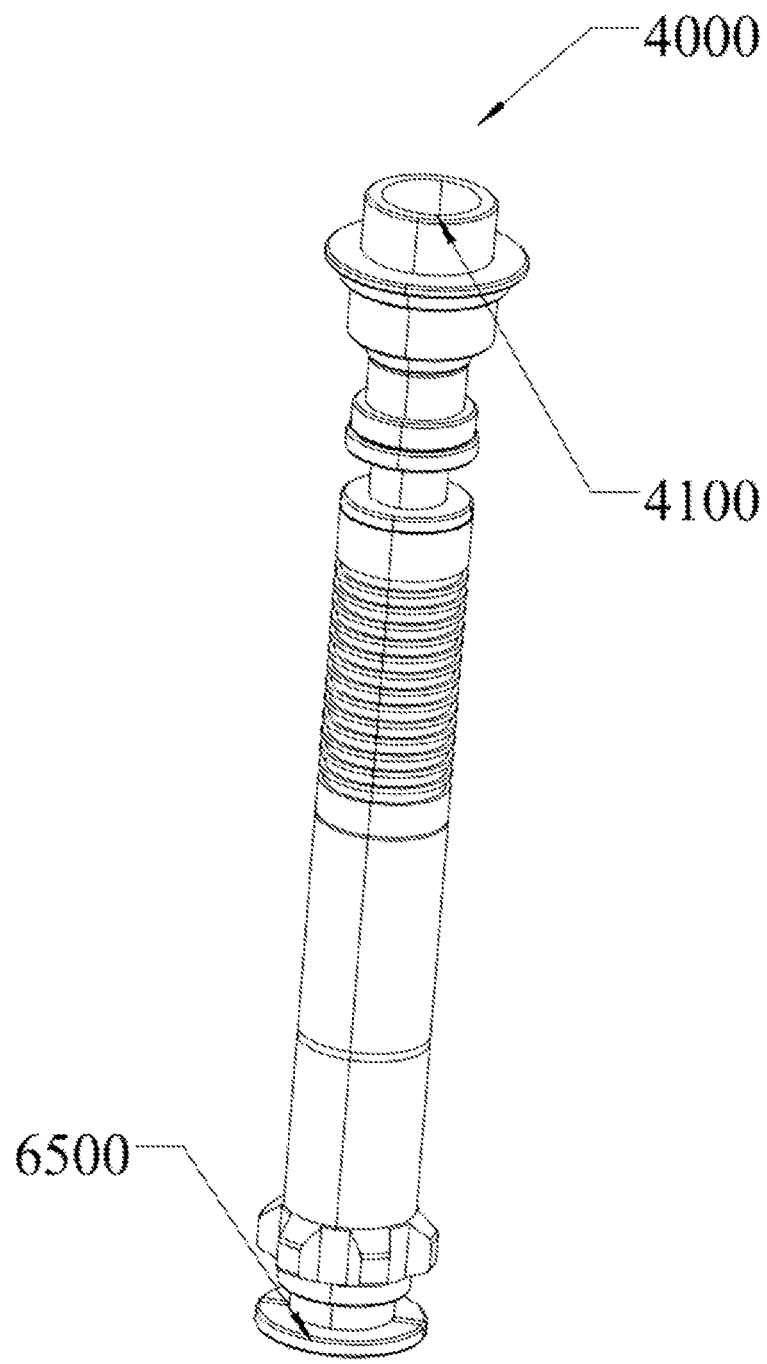
FIG. 9 is a schematic diagram of the support rod of the present invention.
Figure 10:
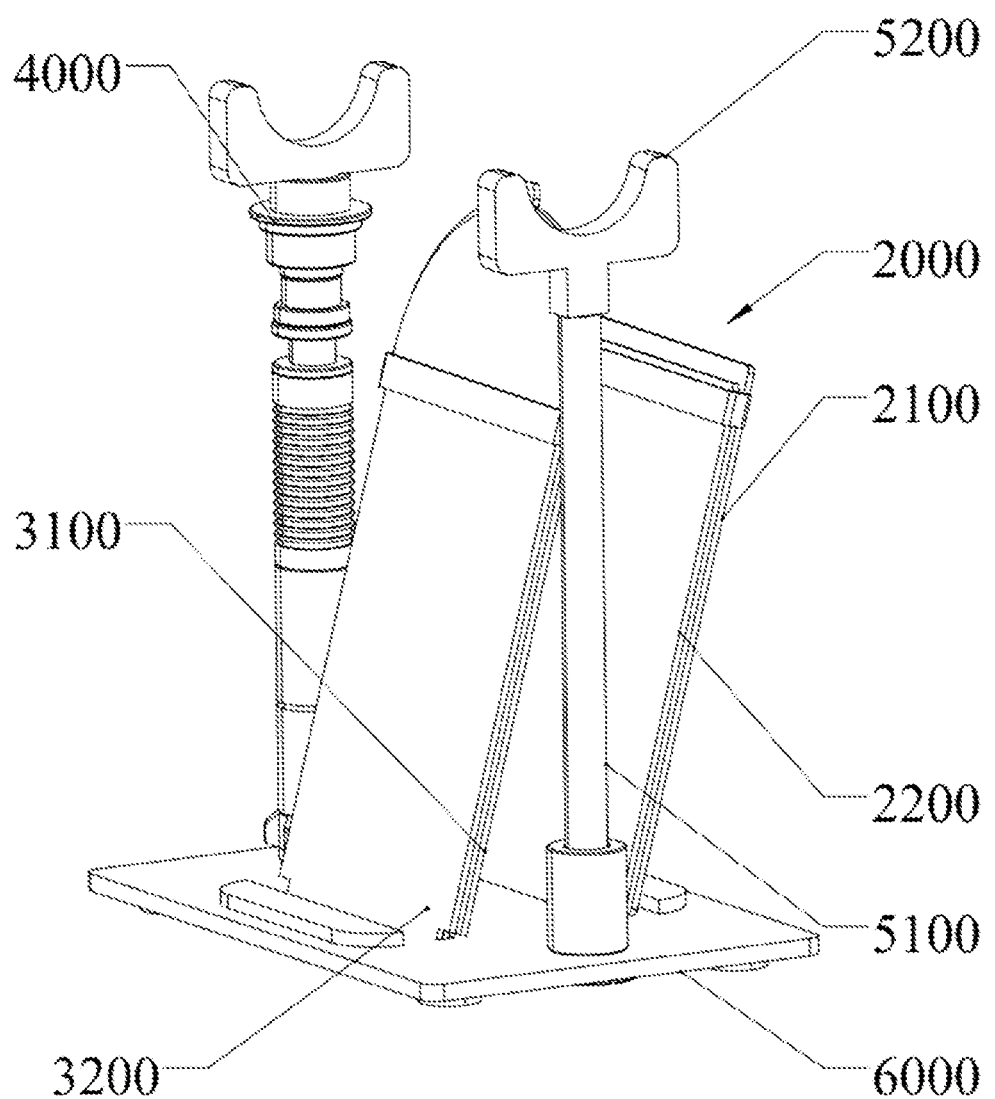
FIG. 10 is a schematic diagram of the structure of the present invention.

As shown in FIGS. 2 and 9, the support rod 4000 is a supporting component. It has a third slot 4100 at the top, which contains a detachable light bulb as a lighting component. The light bulb is connected to the third slot 4100 by a thread. The light bulb can provide lighting, thus eliminating the need to set up a desk lamp where the bracket is placed, saving desktop space. In some embodiments, other components can also be placed in the third slot 4100, such as decorations, or shelves for items as shown in FIG. 10. The support rod 4000 as a whole has an irregular cylindrical structure. The outer surface is set with decorative threads and cylindrical structures with size differences, thereby improving the overall aesthetics and making the bracket more pleasing to the eye. The support rod 4000 contacts the connection hole 6100 of the base stand 6000, thus being fixed above the base stand 6000.

Figure 11:
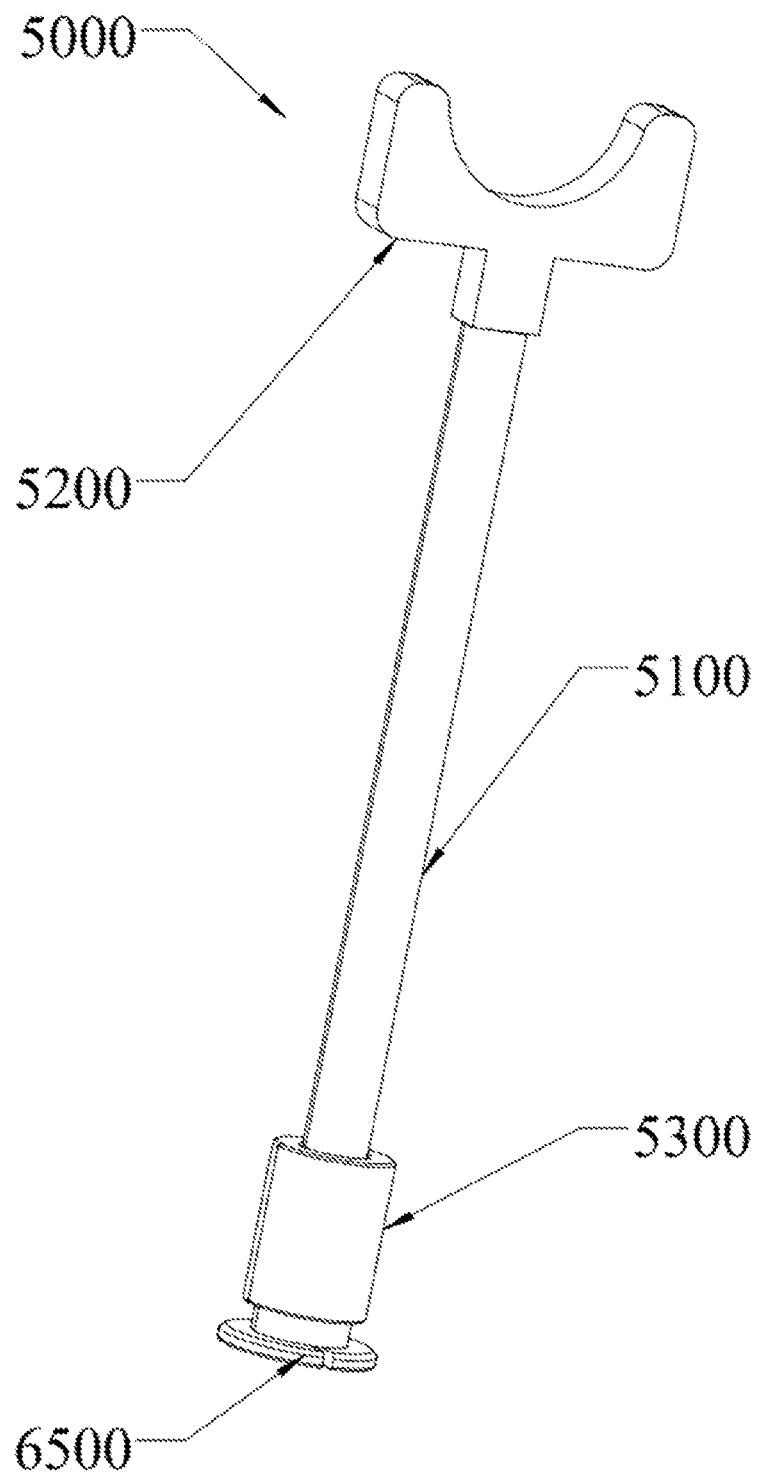
FIG. 11 is a schematic diagram of the stand column of the present invention.

As shown in FIG. 11, the stand column 5000 is a supporting component with a placement function. It includes a cylinder 5100 and a placement block 5200. The placement block 5200 is set on the cylinder 5100. The placement block 5200 has a curved arc-shaped groove for placing items, providing more storage space for the bracket.

The bottom of the cylinder 5100 has a circular platform 5300. There is a hole in the middle of the circular platform 5300. The cylinder 5100 is inserted into the hole and fixed in the circular platform 5300. The circular platform 5300 contacts the connection hole 6100 of the base stand 6000, thus fixing the stand column 5000 above the base stand 6000.

In this embodiment, the support rod 4000 and stand column 5000 are symmetrically distributed on both sides of photo frame 2000 and mobile phone holder 3000. There is a gap distance between support rod 4000 and stand column 5000. The gap distance is 10 cm to 15 cm. In some embodiments, the gap distance can also be other lengths as long as it allows support rod 4000 and stand column 5000 to be normally placed on both sides of photo frame 2000 and mobile phone holder 3000.

As a preferred embodiment of this invention, this invention also provides a method of using the multifunctional bracket 1000.

In this embodiment, both the circular platform 5300 and the support rod 4000 in the multifunctional bracket 1000 are equipped with fixed sleeve 6500.

Specifically, when the photo frame 2000 needs to be connected with the base stand 6000, the first connection section 2300 at the lower ends of the fixed backboard 2100 and the transparent board 2200 completely overlap and are attached and fixed. The first connection section 2300 of the photo frame 2000 is inserted into the connection slot 6200. The photo frame 2000 is inserted into the connection slot 6200 as a whole at an angle. Through the mutual restriction between the first connection section 2300 and the connection slot 6200, the photo frame 2000 is fixed on the base stand 6000. This connection method is simple and convenient, does not require other connection tools, and can be disassembled when not in use.

When the mobile phone holder 3000 needs to be connected with the base stand 6000, the second connection section 3300 at the lower ends of stand backboard 3100 and support board 3200 completely overlap and are attached and fixed. The second connection section 3300 of mobile phone holder 3000 is inserted into connection slot 6200. Mobile phone holder 3000 is inserted into connection slot 6200 as a whole at an angle. Through mutual restriction between second connection section 3300 and connection slot 6200, mobile phone holder 3000 is fixed on base stand 6000. This connection method is simple and convenient, does not require other connection tools, and can be disassembled when not in use.

When support rod 4000 needs to be connected with base stand 6000, support rod 4000 contacts connection hole 6100 of base stand 6000. Support rod 4000 is placed on upper surface of base stand 6000. Fixed sleeve 6500 passes through connection hole 6100 below, inserts into bottom of support rod 4000, so that base stand 6000 is clamped between fixed sleeve 6500 and support rod 4000, thereby fixing support rod 4000 on base stand 6000.

When stand column 5000 needs to be connected with base stand 6000, circular platform 5300 of stand column 5000 contacts connection hole 6100 of base stand 6000. Stand column 5000 is placed on upper surface of base stand 6000. Fixed sleeve 6500 passes through connection hole 6100 below, inserts into bottom of circular platform 5300, so that base stand 6000 is clamped between fixed sleeve 6500 and circular platform 5300, thereby fixing stand column 5000 on base stand 6000.

In this embodiment, the multifunctional bracket 1000 is mainly used on a desk. In some embodiments, this invention can be applied in various scenarios. For example, on an office desktop, this invention can help users place their mobile phones in a fixed position, making it convenient to view information and answer calls. At the same time, it can also be used for decoration to achieve a more comfortable visual effect, prevent health problems caused by work fatigue, and improve work efficiency. Or it can be used on a home desktop to support items, making the home space tidier and more orderly. Or it can be used in commercial displays. In stores or exhibitions, it can be used to display goods or information to attract customers' attention. Or it can be used inside a car. This invention can fix the mobile phone on the dashboard or air vent of the car, making it convenient to use navigation and answer calls, while also providing decorative effects for the car. Or it can be applied in other common life scenarios.

In summary, this invention provides a new type of multifunctional bracket. This bracket has a photo frame, and the structure of the photo frame can make the photo more stable and convenient to change. In addition, this bracket has functions such as lighting, supporting mobile phones, wireless charging and acting as a stand, which can meet most of the users' needs. This bracket has multiple functions, is convenient to use, simple in structure, easy to disassemble and assemble, and beautiful in appearance. It realizes multiple uses of one object and further improves the user's experience.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or"

is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A multifunctional bracket, comprising:
a photo frame, a mobile phone holder, a support rod, a stand column, and a base stand, wherein
said photo frame is composed of a fixed backboard and a transparent board, the bottom ends of said fixed backboard and said transparent board are fixedly connected, and the upper ends are connected to each other in a detachable manner;
said mobile phone holder includes a stand backboard and a support board, said stand backboard and said support board are attached to each other, and a charging device is installed on the back of said stand backboard;
the top of said support rod is equipped with a third slot, and a detachable light bulb is placed in said third slot;
said stand column is composed of a cylinder and a placement block, said placement block is configured at the top of said cylinder;
among them, said base stand is configured to bear said photo frame and said mobile phone holder, said support rod and said stand column are respectively set on both sides of said photo frame.

2. The multifunctional bracket according to claim 1, wherein
said base stand is approximately rectangular, with at least two connection holes and at least two connection slots, said connection holes and said connection slots are symmetrically distributed on said base stand.

3. The multifunctional bracket according to claim 2, wherein
said connection holes and said connection slots penetrate said base stand.

4. The multifunctional bracket according to claim 3, wherein
at least two limit blocks are set on the upper surface of said base stand, and said limit block is a symmetrical protruding structure.

5. The multifunctional bracket according to claim 4, wherein
the four corners of said base stand are rounded, and multiple anti-slip mats are opened on the lower surface of said base stand, said multiple anti-slip mats are located at the four corners of said base stand.

6. The multifunctional bracket according to claim 5, wherein
the surface area of said fixed backboard is larger than that of said transparent board, and said fixed backboard and said transparent board are closely attached.

7. The multifunctional bracket according to claim 6, wherein
a first slot is set on the upper end of said fixed backboard, and said fixed backboard and said transparent board are fixed by an elastic silicone tape, said first slot is used to fix said elastic silicone tape.

8. The multifunctional bracket according to claim 7, wherein
the upper ends of said fixed backboard and said transparent board are in an openable state, with an opening angle of 0° to 30°.

9. The multifunctional bracket according to claim 8, wherein
both said fixed backboard and said transparent board are rectangular in shape, said fixed backboard is made of aluminum alloy material, and said transparent board is made of acrylic material.

10. The multifunctional bracket according to claim 9, wherein
a first connection section is set at the lower end of said fixed backboard and said transparent board, said first connection section is embedded in said connection slot, making said photo frame and said base stand detachably connected.

11. The multifunctional bracket according to claim 10, wherein
the surface area of said stand backboard is larger than that of said support board, and said stand backboard and said support board are closely attached.

12. The multifunctional bracket according to claim 11, wherein
a second slot is set on the upper end of said stand backboard, and said stand backboard and said support board are fixed by an elastic silicone tape, said second slot is used to fix said elastic silicone tape.

13. The multifunctional bracket according to claim 12, wherein
a second connection section is set at the lower end of said stand backboard and said support board, said second connection section is embedded in said connection slot, making said mobile phone holder and said base stand detachably connected.

14. The multifunctional bracket according to claim 13, wherein there is a protruding semi-circular block at the top end of said stand backboard, said stand backboard and said support board are track-shaped, and both materials are made of aluminum alloy.

15. The multifunctional bracket according to claim 14, wherein
said photo frame and said mobile phone holder are parallel to each other, with a gap distance of 5 cm to 10 cm in between.

16. The multifunctional bracket according to claim 15, wherein
a circular platform is configured at the bottom of said cylinder, said cylinder is inserted into said circular platform and fixed inside it.

17. The multifunctional bracket according to claim 16, wherein
said support rod and said stand column are symmetrically distributed with an interval distance of 10 cm to 15 cm.

18. A method of using a multifunctional bracket, comprising:
providing a multifunctional bracket,
said multifunctional bracket includes a photo frame, a mobile phone holder, a support rod, a stand column, and a base stand, said photo frame is composed of a fixed backboard and a transparent board; said mobile phone holder includes a stand backboard and a support board, and a charging device is installed on the back of said stand backboard; the top of said support rod is equipped with a detachable light bulb; said support rod includes a circular platform; both said circular platform and said support rod are equipped with a fixed sleeve;
said base stand is equipped with at least two connection holes and at least two connection slots, and a limit block is set on the upper surface of said base stand, wherein
said photo frame is inserted into said connection slot at an angle, forming an insert connection with said base stand;
said mobile phone holder is inserted into said connection slot at an angle, forming an insert connection with said base stand;
said support rod is inserted into said connection hole, and fixed on the upper surface of said base stand through said fixed sleeve;
said stand column is inserted into said connection hole, and fixed on the upper surface of said base stand through said fixed sleeve.

19. The method of using a multifunctional bracket according to claim 18, wherein
when placing photos, photos are placed between said fixed backboard and said transparent board.

20. The method of using a multifunctional bracket according to claim 19, wherein
when placing a mobile phone, the mobile phone is placed on said support board, said mobile phone holder provides support and charging for the mobile phone, and said limit block fixes and limits the mobile phone.

* * * * *